US008985609B2

(12) United States Patent
Huang

(10) Patent No.: US 8,985,609 B2
(45) Date of Patent: Mar. 24, 2015

(54) SCOOTER REAR SHOCK DAMPING STRUCTURE

(71) Applicant: Laing Ban International Inc., Taoyuan County (TW)

(72) Inventor: Wen-Hung Huang, Taoyuan County (TW)

(73) Assignee: Laing Ban International Inc., Taoyuan County (TW)

( * ) Notice: Subject to any disclaimer, the term of this patent is extended or adjusted under 35 U.S.C. 154(b) by 0 days.

(21) Appl. No.: 14/158,686

(22) Filed: Jan. 17, 2014

(65) Prior Publication Data

US 2014/0203531 A1 Jul. 24, 2014

(30) Foreign Application Priority Data

Jan. 18, 2013 (TW) .............................. 102201225 A

(51) Int. Cl.
*B60G 3/14* (2006.01)
*B62K 25/04* (2006.01)
*B62K 3/00* (2006.01)

(52) U.S. Cl.
CPC . *B60G 3/14* (2013.01); *B62K 25/04* (2013.01); *B62K 3/002* (2013.01)
USPC .......................................... 280/284; 180/227

(58) Field of Classification Search
CPC ............. B60G 3/145; B60G 2204/148; B62K 2700/56; B62K 25/10; B62K 3/002; B62B 3/007; B62B 11/00; B62B 15/008
USPC .......... 280/284, 285, 87.01, 65; 180/227, 210
See application file for complete search history.

(56) References Cited

U.S. PATENT DOCUMENTS

| 2,526,866 | A  | * | 10/1950 | Hersey et al. ................. 267/253 |
| 3,594,017 | A  | * | 7/1971  | Grosseau ............... 280/124.116 |
| 4,887,829 | A  | * | 12/1989 | Prince .......................... 280/282 |
| 6,581,711 | B1 | * | 6/2003  | Tuluie .......................... 180/227 |
| 7,641,207 | B2 | * | 1/2010  | Yang ...................... 280/124.103 |
| 8,602,428 | B2 | * | 12/2013 | Swist .................... 280/124.136 |
| 2004/0079571 | A1 | * | 4/2004  | Laver et al. .................. 180/180 |
| 2004/0129471 | A1 | * | 7/2004  | Cheng .......................... 180/181 |
| 2006/0054370 | A1 | * | 3/2006  | Sugioka et al. ............... 180/211 |
| 2012/0256388 | A1 | * | 10/2012 | Swist .................... 280/124.136 |
| 2013/0300082 | A1 | * | 11/2013 | Swinney et al. ............. 280/212 |
| 2014/0054870 | A1 | * | 2/2014  | Wernli ..................... 280/87.043 |
| 2014/0091546 | A1 | * | 4/2014  | Lovley et al. ........... 280/87.041 |
| 2014/0097589 | A1 | * | 4/2014  | Swist .................... 280/124.128 |
| 2014/0203531 | A1 | * | 7/2014  | Huang ................. 280/124.116 |

* cited by examiner

*Primary Examiner* — Karen Beck
(74) *Attorney, Agent, or Firm* — Muncy, Geissler, Olds & Lowe, P.C.

(57) ABSTRACT

A scooter rear shock damping structure comprising a frame and an elastic unit is disclosed. The frame is disposed under a back end of a stepping plate. A forwardly extending front pivotal connect portion of the frame is pivotally connected to the stepping plate. Back positioning pieces backwardly extending from left and right sides of the frame respectively are coaxially fixed by left and right sides of a rear wheel. The elastic unit is positioned between the back end of the stepping plate and the frame. Thereby, when a user steps on the stepping plate to ride on the scooter and the rear wheel is in contact with the ground, and when the scooter travels on ragged surfaces; the support, compression and resilience of the elastic unit enable the rear wheel to move upward and downward relative to the stepping plate for buffering shock damping effect.

8 Claims, 5 Drawing Sheets

SCOOTER REAR SHOCK DAMPING STRUCTURE

BACKGROUND OF THE INVENTION

1. Field of Invention

The present invention relates to a scooter and more particularly to a simple structured scooter rear shock damping structure for providing comfortable ride for users and ensuring safety.

2. Related Art

Because of the lightweight and compactness of scooter, it is portable and has become a popular and trendy means of transportation and exercising in leisure time. When a scooter is traveled on a ragged road, the scooter stepping plate will become unstable for maneuvering because of upward and downward rebounding of the scooter front and rear wheels and cause the user's foot to slide off from the stepping plate due to excessive rebounding of the rear wheel. Therefore, some scooters are disposed with a shock damping device installed between the stepping plate and the rear wheel in order to avoid excessive rebounding of the rear wheel for enhancing the scooter maneuverability as well as reducing a wear rate of the rear wheel.

SUMMARY OF THE INVENTION

However, structures of common scooter shock damping devices are rather complicated. Furthermore, when the scooter is traveled on road surfaces with large height differences, spring compression stroke will be too long to cause excessive rebounding of the stepping plate, or the stepping plate will be in contact with road surfaces to cause danger when the stepping plate is pressed downward.

In view of the above, a scooter rear shock damping structure of the present invention is provided to improve the above drawbacks of conventional scooter shock damping devices and to achieve the following objectives.

A primary objective of the present invention is to provide a simple structured scooter rear shock damping structure which can reduce manufacturing costs effectively.

A secondary objective of the present invention is to provide a scooter rear shock damping structure for buffering shock damping effect, providing comfortable ride for users, reducing rear wheel wear rate, and ensuring riding safety effectively.

In order to achieve the above-mentioned objectives, the scooter rear shock damping structure of the present invention is connected between a back end of a stepping plate and a rear wheel. The rear shock damping structure comprises a frame and an elastic unit. The frame is disposed under the back end of the stepping plate. A forwardly extending front pivotal connect portion of the frame is pivotally connected to the stepping plate. Two back positioning pieces backwardly extending from left and right sides of the frame respectively are coaxially fixed by left and right sides of the rear wheel. The elastic unit is positioned between the back end of the stepping plate and the frame for buffering shock damping effect when a user is stepping on the stepping plate and the rear wheel is in contact with a road surface.

When the scooter rear shock damping structure is embodied, the front pivotal connect portion comprises front pivotal connect pieces forwardly extended from the left and right sides of the frame respectively. The two front pivotal connect pieces are pivotally and coaxially connected to left and right sides of the stepping plate respectively.

When the scooter rear shock damping structure is embodied, a bottom plate with a through hole is disposed at a bottom end of the frame, and a screw is penetrated through the through hole and the elastic unit upwardly for positioning the elastic unit between the back end of the stepping plate and the frame.

When the scooter rear shock damping structure is embodied, a limiting portion is disposed on a bottom side of the back end of the stepping plate for limiting the elastic unit. The elastic unit is a spring.

The present invention will become more fully understood by reference to the following detailed description thereof when read in conjunction with the attached drawings.

DETAILED DESCRIPTION OF THE INVENTION

A scooter rear shock damping structure of the present invention is connected between a back end of a stepping plate and a rear wheel. The rear shock damping structure comprises a frame and an elastic unit. A forwardly extending front pivotal connect portion of the frame is pivotally connected to the stepping plate. Two back positioning pieces backwardly extending from left and right sides of the frame respectively are coaxially fixed by left and right sides of the rear wheel. The elastic unit is positioned between the back end of the stepping plate and the frame.

Figure 1:
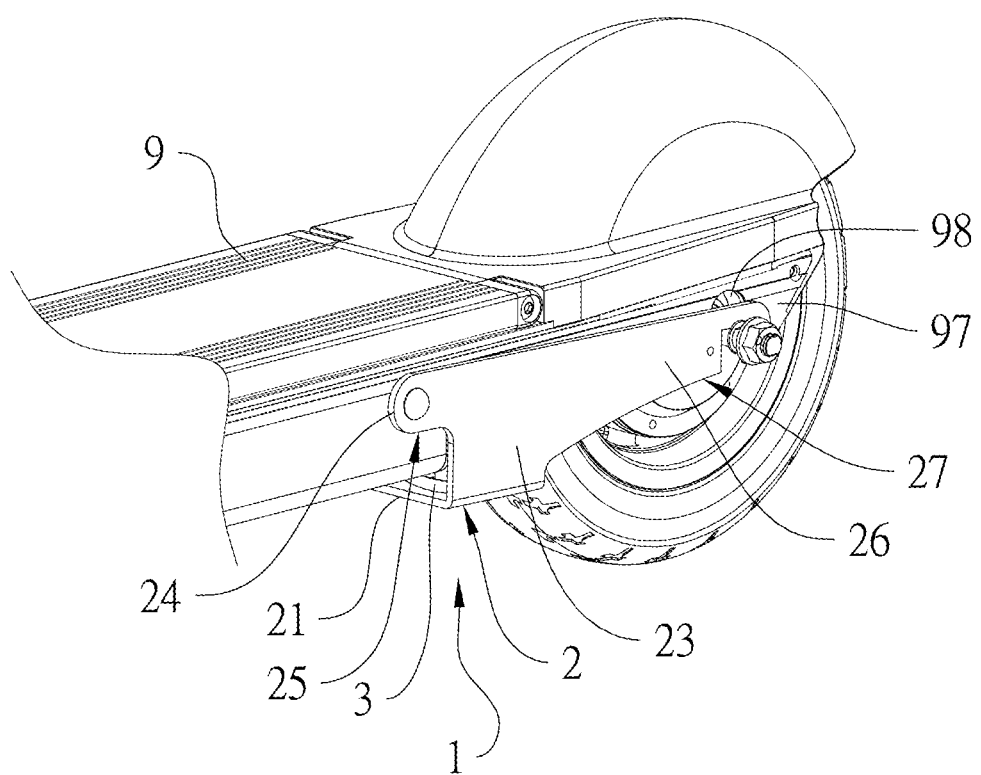
FIG. 1 is a perspective view of a scooter rear shock damping structure connected between a back end of a stepping plate and a rear wheel according to a preferred embodiment of the present invention.
Figure 2:
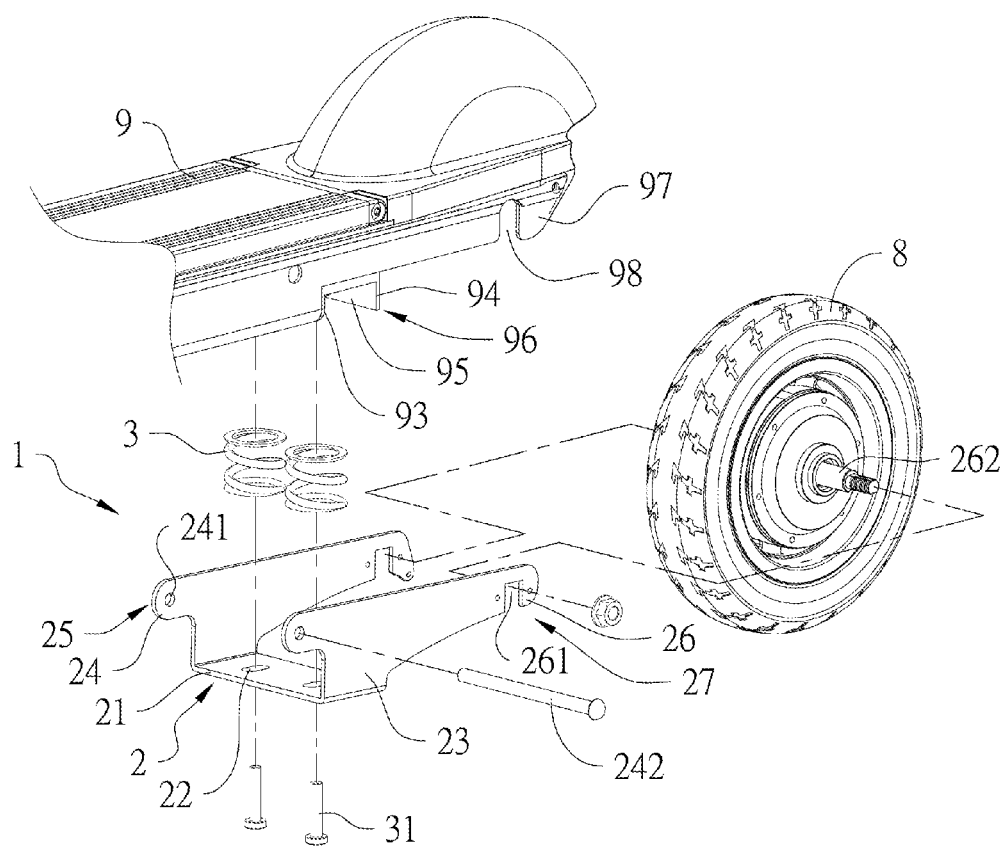
FIG. 2 is a perspective exploded view of the scooter rear shock damping structure according to the preferred embodiment of the present invention.

Please refer to FIGS. 1 and 2. The figures respectively show a perspective view and a perspective exploded view of a scooter rear shock damping structure 1 according to a preferred embodiment of the present invention. The rear shock damping structure 1 comprises a frame 2 and an elastic unit 3.

The frame 2 comprises a flat bottom plate 21, and two through holes 22 are disposed on a surface of the bottom plate 21. A vertical plate 23 is upwardly extended from left and right sides of the flat bottom plate 21 respectively. A front pivotal connect piece 24 is forwardly extended from a front end of the two left and right vertical plates 23 respectively. A pivotal connect hole 241 is disposed on the two front pivotal connect pieces 24 respectively. The two front pivotal connect pieces 24 together form a front pivotal connect portion 25. A back positioning piece 26 is backwardly extended from a back end of the two left and right vertical plates 23 respectively. A positioning groove 261 is disposed on the two back positioning pieces 26 respectively. The two back positioning pieces 26 together form a back positioning portion 27.

The elastic unit 3 is a compression spring. In this embodiment, two of the elastic units 3 are disposed. In embodying, one of the elastic unit 3 can also be disposed, and only one of the through holes 22 can be disposed on the surface of the bottom plate 21.

Figure 3:
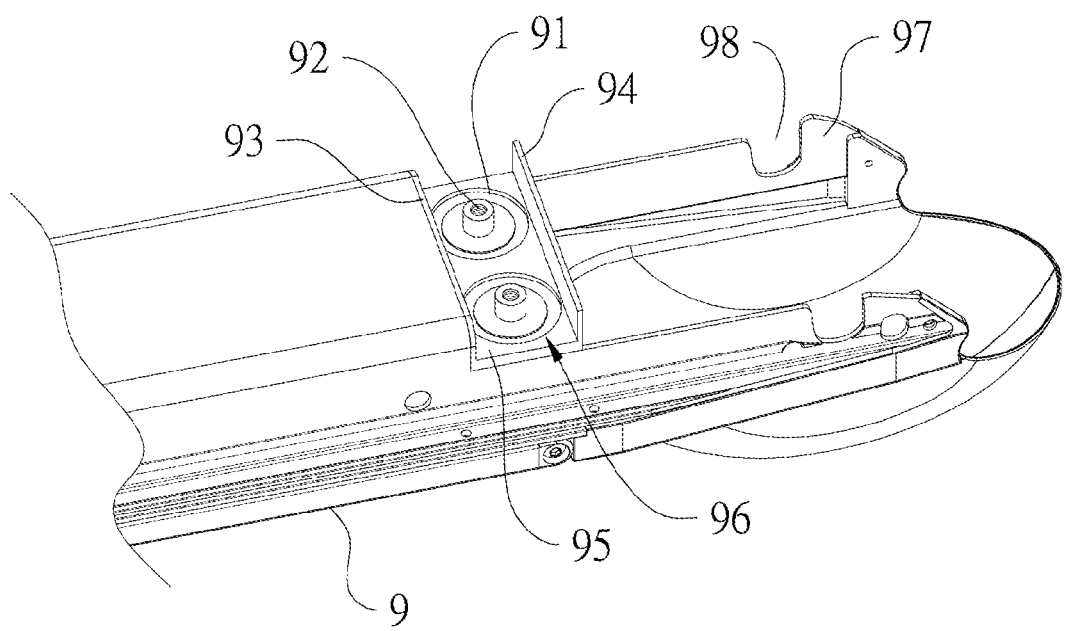
FIG. 3 is a perspective view of the stepping plate taken from another angle.

Please refer to FIG. 3 besides FIGS. 1 and 2. Two circular grooves 91 arranged side by side are disposed on a bottom side of a back end of a stepping plate 9, and a screw hole 92 is disposed in the two grooves 91 respectively. A step 93 is formed on the bottom side of the back end of the stepping plate 9, and a plate 94 is disposed at a back end of the step 93. An elongated groove 95 is formed between the plate 94 and the step 93. The elongated groove 95 and the two grooves 91 together form a limiting portion 96. Furthermore, a lateral plate 97 is downwardly extended from left and right sides of the back end of the stepping plate 9 respectively. An indentation 98 with an opening facing downwardly is formed at a bottom of each of the lateral plates 97 respectively.

Figure 4:
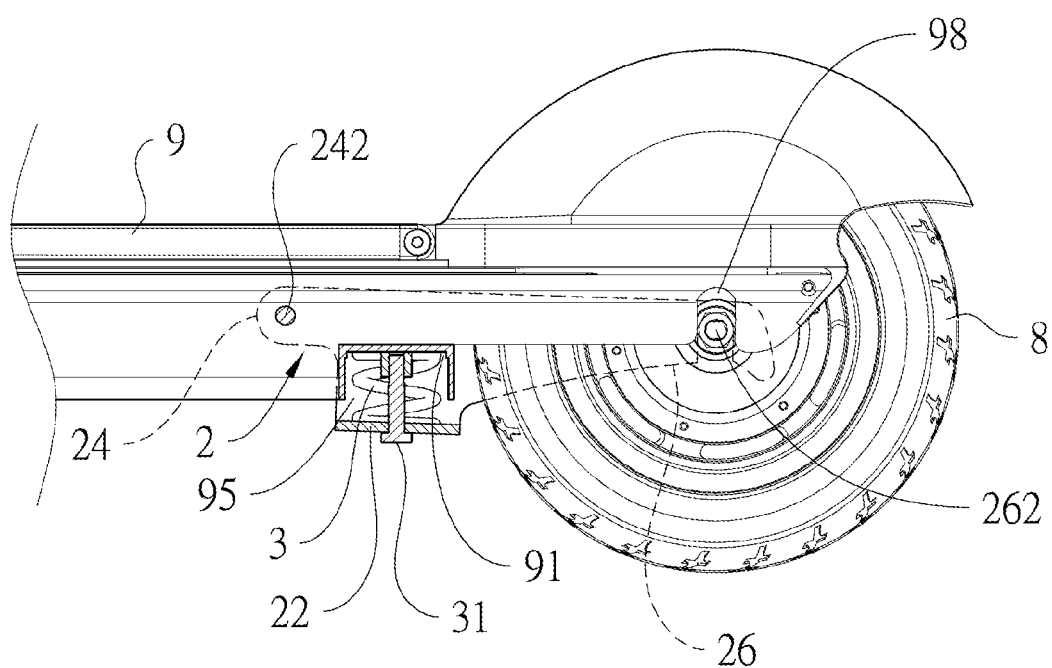
FIG. 4 is a partial sectional view of the scooter rear shock damping structure according to the preferred embodiment of the present invention.

Please refer to FIGS. 2 and 4. In assembling, the frame 2 is disposed under the back end of the stepping plate 9. The two front pivotal connect pieces 24 at the front end of the frame 2 are pivotally and coaxially connected to the left and right sides of the stepping plate 9 by a pivotal connect bar 242. The two back positioning pieces 26 at the back end of the frame 2 are coaxially fixed by left and right sides of a rear wheel 8 by an axial bar 262. Top ends of the two elastic units 3 are respectively accommodated in the two circular grooves 91 on the bottom side of the back end of the stepping plate 9, and the two elastic units 3 are disposed in the elongated groove 95. Two screws 31 are respectively penetrated through the through holes 22 and the elastic units 3 upwardly for positioning the elastic units 3 between the back end of the stepping plate 9 and the frame 2, and the axial bar 262 is accommodated in the indentation 98 under the back end of the stepping plate 9.

Figure 5:
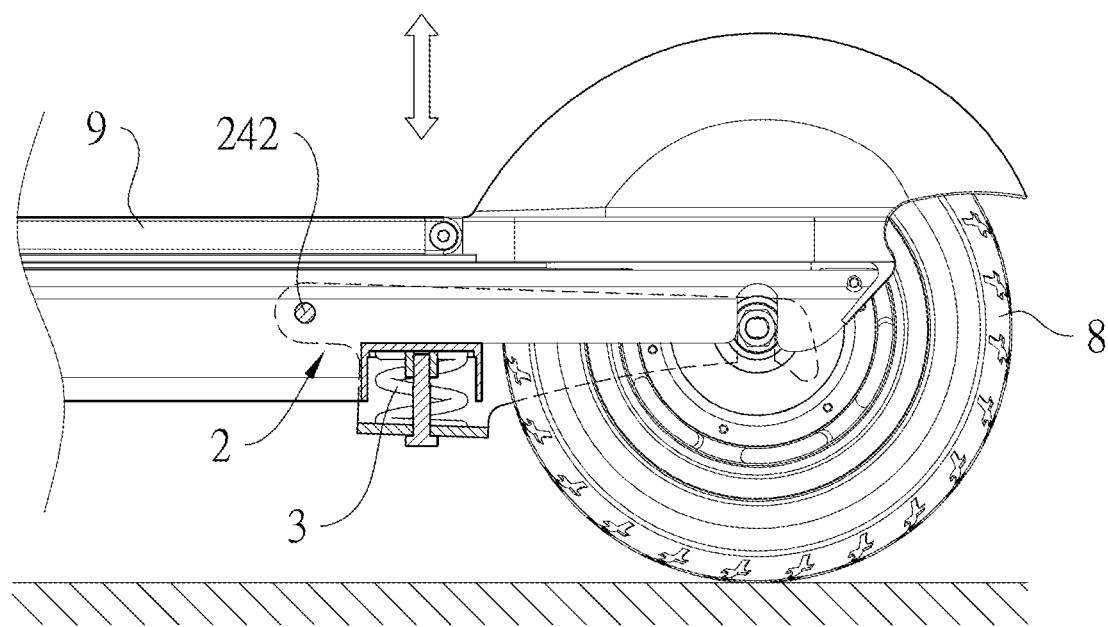
FIG. 5 is a schematic view of the scooter rear shock damping structure in application according to the preferred embodiment of the present invention.

Thereby, as shown in FIG. 5, when a user is stepping on the stepping plate 9 to ride on the scooter and the rear wheel 8 is in contact with the ground, and when the scooter travels on ragged surfaces; the support, compression and resilience of the elastic units 3 enable the frame 2 to sway upward and downward using the pivotal connect bar 242 as an axis, and the rear wheel 8 to move upward and downward relative to the stepping plate 9 for damping shock and buffering shock damping effect.

Therefore, the present invention has the following advantages:

1. The simple structured scooter rear shock damping structure has excellent practicality and can be assembled easily, and therefore manufacturing costs can be effectively reduced.

2. The elastic units of the scooter rear shock damping structure can be positioned between the back end of the stepping plate and the frame, and the axial bar can be moved upward and downward in the indentation under the back end of the stepping plate. Therefore, not only that shock damping effect can be buffered effectively, comfortable ride can be provided for the user, and the rear wheel wear rate can be reduced. Furthermore, the stepping plate can be avoided from contacting with road surfaces caused by large height differences of uneven road surfaces or excessive downward pressing of the stepping plate in order to enhance maneuverability and stability as well as ensure riding safety.

As a conclusion from the above descriptions, the expected objectives can be achieved by the scooter rear shock damping structure of the present invention which not only can buffer shock damping effect and reduce the rear wheel wear rate, but can also enhance maneuverability and stability for ensuring riding safety.

Although the embodiments of the present invention have been described in detail, many modifications and variations may be made by those skilled in the art from the teachings disclosed hereinabove. Therefore, it should be understood that any modification and variation equivalent to the spirit of the present invention be regarded to fall into the scope defined by the appended claims.

What is claimed is:

1. A scooter rear shock damping structure for connecting between a back end of a stepping plate and a rear wheel, the rear shock damping structure comprising:
   a frame disposed under the back end of the stepping plate, a forwardly extending front pivotal connect portion of the frame being pivotally connected to the stepping plate, two back positioning pieces backwardly extending from left and right sides of the frame respectively being coaxially fixed by left and right sides of the rear wheel; and
   an elastic unit positioned between the back end of the stepping plate and the frame for buffering shock damping effect when a user stepping on the stepping plate and the rear wheel being in contact with a road surface,
   wherein a bottom plate with a through hole is disposed at a bottom end of the frame, a screw is penetrated through the through hole and the elastic unit upwardly for positioning the elastic unit between the back end of the stepping plate and the frame.

2. The scooter rear shock damping structure as claimed in claim 1, wherein the front pivotal connect portion comprises front pivotal connect pieces forwardly extended from the left and right sides of the frame respectively, the two front pivotal connect pieces are pivotally and coaxially connected to left and right sides of the stepping plate respectively.

3. The scooter rear shock damping structure as claimed in claim 2, wherein a limiting portion is disposed on a bottom side of the back end of the stepping plate for limiting the elastic unit.

4. The scooter rear shock damping structure as claimed in claim 2, wherein the elastic unit is a spring.

5. The scooter rear shock damping structure as claimed in claim 2, wherein the two back positioning pieces are coaxially fixed by the left and right sides of the rear wheel by an axial bar, an indentation is disposed under the back end of the stepping plate for accommodating the axial bar inside.

6. The scooter rear shock damping structure as claimed in claim 1, wherein a limiting portion is disposed on a bottom side of the back end of the stepping plate for limiting the elastic unit.

7. The scooter rear shock damping structure as claimed in claim 1, wherein the elastic unit is a spring.

8. The scooter rear shock damping structure as claimed in claim 1, wherein the two back positioning pieces are coaxially fixed by the left and right sides of the rear wheel by an axial bar, an indentation is disposed under the back end of the stepping plate for accommodating the axial bar inside.

* * * * *